(12) United States Patent
Shen et al.

(10) Patent No.: US 7,106,930 B2
(45) Date of Patent: Sep. 12, 2006

(54) DYNAMIC OPTICAL DEMULTIPLEXER/MULTIPLEXER FORMED WITHIN A PLC

(75) Inventors: Jinxi Shen, San Ramon, CA (US); Anca L. Sala, Sunnyvale, CA (US); David J. Dougherty, Mountain View, CA (US); David Funk, San Jose, CA (US); Douglas E. Crafts, San Jose, CA (US); Barthelemy Fondeur, Mountain View, CA (US); Pang-Chen Sun, San Diego, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 134 days.

(21) Appl. No.: 10/878,935

(22) Filed: Jun. 28, 2004

(65) Prior Publication Data

US 2005/0018965 A1 Jan. 27, 2005

Related U.S. Application Data

(60) Provisional application No. 60/489,545, filed on Jul. 23, 2003.

(51) Int. Cl.
G02B 6/34 (2006.01)
(52) U.S. Cl. ............ 385/37; 385/31; 385/32; 385/39; 385/46; 385/50
(58) Field of Classification Search ............ 385/37
See application file for complete search history.

(56) References Cited

U.S. PATENT DOCUMENTS

| | | | | |
|---|---|---|---|---|
| 5,546,483 A | * | 8/1996 | Inoue et al. ............ | 385/14 |
| 5,809,184 A | * | 9/1998 | Doerr et al. ............ | 385/11 |
| 5,905,824 A | | 5/1999 | Delisle et al. ............ | 385/15 |
| 5,933,270 A | * | 8/1999 | Toyohara ............ | 359/341.3 |
| 6,212,315 B1 | * | 4/2001 | Doerr ............ | 385/31 |
| 6,266,460 B1 | * | 7/2001 | Doerr ............ | 385/16 |
| 6,278,813 B1 | * | 8/2001 | Takada et al. ............ | 385/24 |
| 6,445,847 B1 | * | 9/2002 | Doerr ............ | 385/24 |
| 6,487,336 B1 | * | 11/2002 | Yao ............ | 385/24 |
| 6,504,970 B1 | | 1/2003 | Doerr ............ | 385/24 |
| 6,636,657 B1 | * | 10/2003 | Aksyuk et al. ............ | 385/24 |
| 6,807,372 B1 | * | 10/2004 | Lee et al. ............ | 398/78 |

(Continued)

OTHER PUBLICATIONS

"Silica-Based Thermo-Optic Switches" by M. Okuno et al. NTT Review vol. 7 No. 5, Sep. 1995.

(Continued)

*Primary Examiner*—Frank G. Font
*Assistant Examiner*—Ryan Lepisto
(74) *Attorney, Agent, or Firm*—Allen, Dyer, Doppelt, Milbrath & Gilchrist, P.A.

(57) ABSTRACT

A demultiplexer/multiplexer is disclosed wherein an arrayed waveguide grating having a reflector at an end includes selectable signal path blockers. The arrayed waveguide device has a common input/output port for launching radiation in the form of an input signal having n wavelengths therein and for receiving back via the reflector at the input/output port a selected channel of the input signal. In operation a multiplexed signal have n channels is launched therein and a selected channel is output for analysis or further processing.

5 Claims, 8 Drawing Sheets

U.S. PATENT DOCUMENTS

| | | |
|---|---|---|
| 6,917,747 B1 * | 7/2005 | Xiao et al. .................. 385/140 |
| 7,003,195 B1 * | 2/2006 | Huang et al. .................. 385/24 |
| 2001/0010739 A1 * | 8/2001 | Takiguchi et al. ............ 385/15 |
| 2002/0071155 A1 * | 6/2002 | Inada et al. .................. 359/124 |
| 2002/0172455 A1 * | 11/2002 | Doerr .......................... 385/24 |
| 2003/0228091 A1 * | 12/2003 | Lee et al. ..................... 385/18 |
| 2004/0091199 A1 * | 5/2004 | Goodfellow ................. 385/16 |
| 2005/0053324 A1 * | 3/2005 | Ridgway ...................... 385/23 |

OTHER PUBLICATIONS

"Silica-Based Thermo-Optic Switches" by M. Okuno et al. NTT Review vol. 7 No. 5, Sep. 1995 Since the copy of this article filed with a previous IDS was missing a page, the article is being resubmitted.

* cited by examiner

DYNAMIC OPTICAL DEMULTIPLEXER/MULTIPLEXER FORMED WITHIN A PLC

CROSS REFERENCE TO RELATED APPLICATIONS

This application claims priority of U.S. Provisional Patent Application No. 60/489,545 filed Jul. 23, 2003, entitled "Optical Channel Monitor with Integrated Arrayed Waveguides" which is incorporated herein by reference for all purposes.

FIELD OF THE INVENTION

This invention relates generally to an optical demultiplexer/multiplexer formed within a planar lightwave circuit that can be used in an optical performance monitor.

BACKGROUND OF THE INVENTION

Wavelength blockers are well known and commonly used in telecommunications applications for routing signals. U.S. Pat. No. 6,504,970 in the name of Doerr assigned to Lucent Technologies Inc. (Murray Hill, N.J.) incorporated herein by reference discloses a planar lightwave circuit having shutter array disposed between an arrayed waveguide grating (AWG) multiplexer and a demultiplexer for selectively passing or blocking N wavelength signals. In Doerr's device, a wavelength blocker selectively blocks one or more wavelengths or channels from reaching a destination, while allowing other wavelengths or channels to pass to the destination The wavelength blocker device has a plurality of input ports and a plurality of output ports. Doer describes wavelength blockers as devices for accepting an incoming signal of multiple wavelength channels and for independently passing or blocking particular wavelength channels. Wavelength blockers can be used as components in a larger optical communication system, for example, to route a given optical signal along a desired path between a source and destination. Optical cross-connect switches and wavelength add-drop multiplexers, for example, could be implemented using wavelength blockers.

The instant invention, utilizes the wavelength blocking function and obviates the requirement for a costly array of detectors to form an optical performance monitor with an integration of a channel selectable filter.

If integratable components were available at little or no cost, it would likely be simpler when designing an optical performance monitor to design a system that had an integrated demultiplexer to separate an incoming multiplexed signal having n channels having n distinct center wavelengths to n spatially distinct locations, and to place n detectors at those locations to detect a characteristic of each of the n signals, for example signal power. By parallel processing in this manner, the detected power levels of the n channels could be quickly and simply compared.

Unfortunately, this configuration blocked the possibility of signal passthrough for a further signal analysis. Furthermore, utilizing an array of n detectors may require calibration to ensure that responses are matched and the n detectors require alignment and coupling to n waveguides which adds to the cost and complexity of an optical performance monitor.

It is an object of this invention, to provide an optical performance monitor or power monitor that requires fewer detectors than channels to be analyzed and simultaneously an optical channel filter for further signal process.

It is a further object of this invention to provide an optical performance monitor that is substantially integrated within a single chip and which requires few detectors, preferably one, time-shared with between the signals to be analyzed.

SUMMARY OF THE INVENTION

In accordance with an aspect of the invention, there is provided, a demultiplexer/multiplexer comprising
a reflective arrayed waveguide device having
an arrayed waveguide grating;
a reflector disposed to receive radiation from the arrayed waveguide grating and for reflecting the radiation back toward the arrayed waveguide grating, the arrayed waveguide device having a common input/output port for launching radiation in the form of an input signal having n wavelengths therein and for receiving back at the input/output port a portion of the input signal having m wavelengths, wherein n>m>0; and,
means disposed between the reflector and the arrayed waveguide grating for selectively blocking n-m wavelengths so that they are prevented from reflecting back to the input/output port.

In accordance with the invention there is further provided an optical device for monitoring a selected wavelength light signal in a wavelength multiplexed optical signal, comprising;
an array waveguide multiplexer/demultiplexer (AWMD) within a chip, the AWMD having an input/output port and a plurality internal locations to where individual selectable wavelengths are routed as separate wavelength light signals each having a different centre wavelength;
means for coupling the wavelength multiplexed optical signal into the input/output port of the array waveguide multiplexer/demultiplexer for demultiplexing the wavelength multiplexed optical signal into a plurality of wavelength light signals,
a plurality of optical shutters associated with each internal location of the array waveguide multiplexer/multiplexer for selectively blocking or passing the individual wavelength light signals routed to the internal locations of the array waveguide multiplexer/demultiplexer;
one or more reflectors optically coupled to the optical shutters for reflecting any light signals received from one or more of the optical shutters back through the one or more optical shutters into the array waveguide multiplexer/demultiplexer for combining any passed light signals into a selected wavelength light signal at the input/output port of the array waveguide multiplexer/demultiplexer.

BRIEF DESCRIPTION OF THE DRAWINGS

Exemplary embodiments of the invention will now be described in conjunction with the drawings in which.

DETAILED DESCRIPTION

Figure 1:
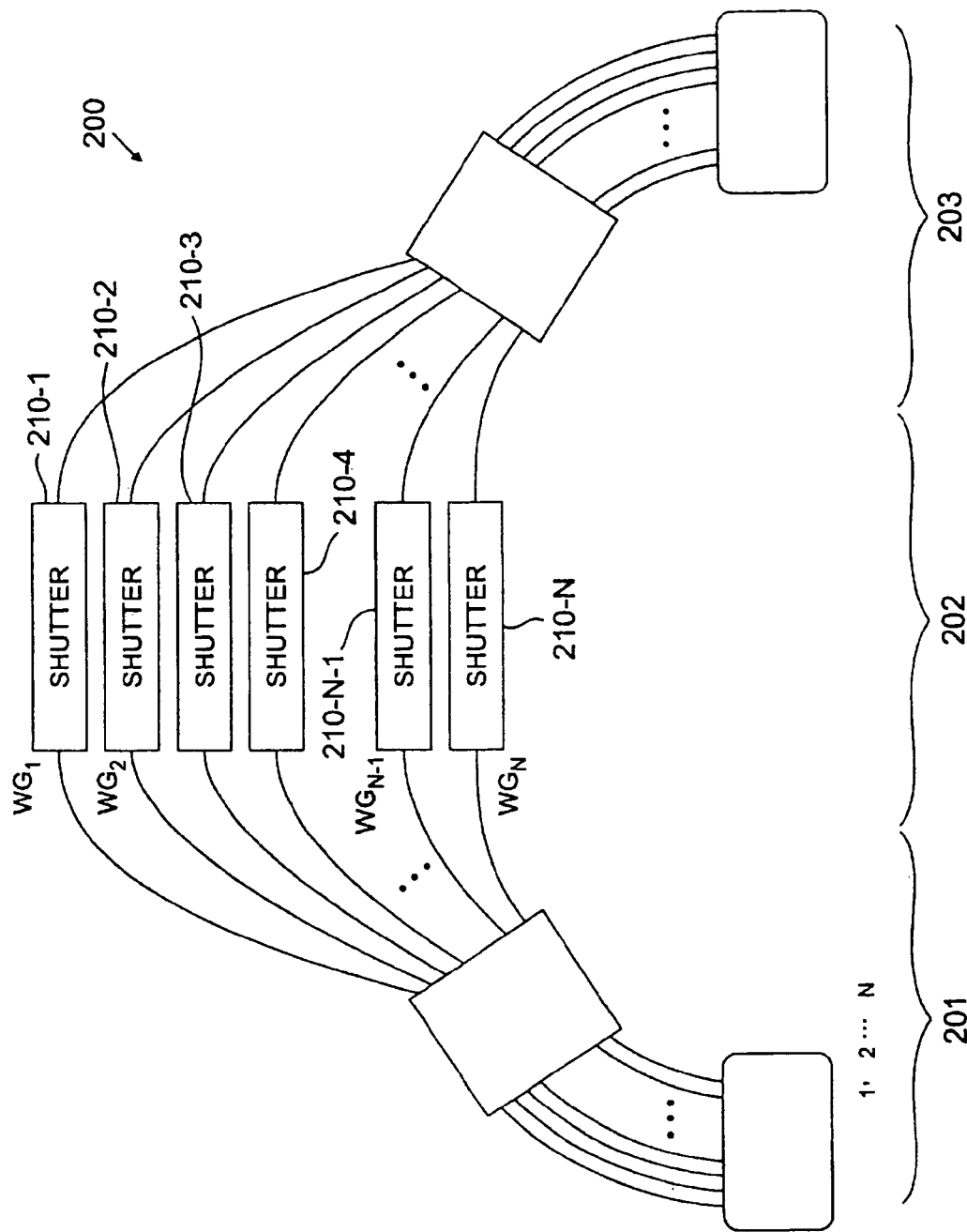
FIG. 1 is a prior art schematic drawing of wavelength blocker wherein blocking switches are disposed between two arrayed waveguide grating (AWG) devices.

Referring now to prior art FIG. 1, a planar lightwave circuit (PLC) is shown wherein a plurality of optical switches 200 in the form of shutters 210-1 to 210-N are disposed between demultiplexer 201 and multiplexer 203 embodied as planar waveguide gratings 202. Optical waveguides $WG_1$ through $WG_N$ are shown coupled to the N shutters. Functionally, this device blocks up to n wavelengths input into the circuit and allows the remaining unblocked wavelength or wavelengths to pass therethrough. In this respect, the circuit shares a similarity with the instant invention. However, the additional functionality and the structural differences provided by the instant invention are significant.

Figure 2:
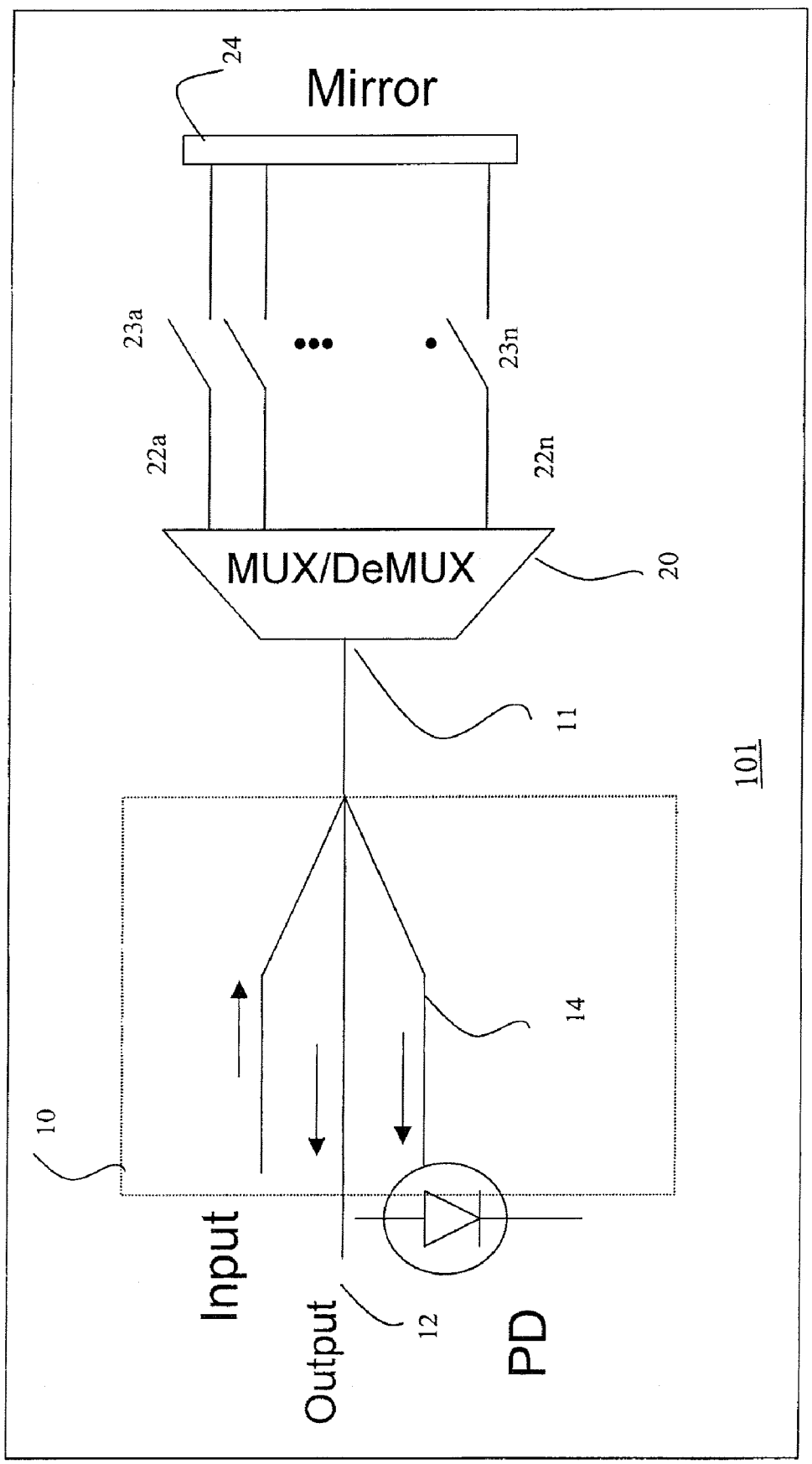
FIG. 2 is a schematic drawing of an optical performance monitor in accordance with an aspect of this invention.

Referring now to FIG. 2, a circuit 101 in accordance with an embodiment of this invention is shown. The circuit includes a input/output end 10 that provides means for routing a composite signal having n wavelengths into an input/output port 11 of a demultiplexer 20 and that allows an output signal having m wavelengths, 0<m<n to be routed out of the input/output port 11 of demultiplexer 20 on two separate waveguides 12 and 14. An array of n waveguides 22a through 22n is disposed between the demultiplexer 20 and a reflector 24 wherein n-a could be any integer greater than 1. Arrays of shutters 23a through 23n are disposed in the path of the waveguide 22a through 22n, for breaking or making a connection along the entire waveguide.

The shutters can be any known shutters that can be formed in a waveguide chip and controlled electrically and/or thermally. The shutters 23a–23n may be embodied as one or more Mach-Zehnder switches or Mach-Zehnder interferometer shutters, such as those described in M. Okuno et al., "Silica-Based Thermo-Optic Switches," NTT Review, Vol. 7, No. 5 (September 1995), each incorporated by reference herein. In addition, the shutters 210-N may be embodied as, e.g., electro-absorption modulators or Y-branch switches. The demultiplexer 20 can be embodied as planar waveguide gratings.

In order to selectively pass or block the incoming signal, the shutters 23a through 23n are controlled by a thermo-optic or electro-optic control signal (not shown), as appropriate for the selected shutter.

Figure 3:
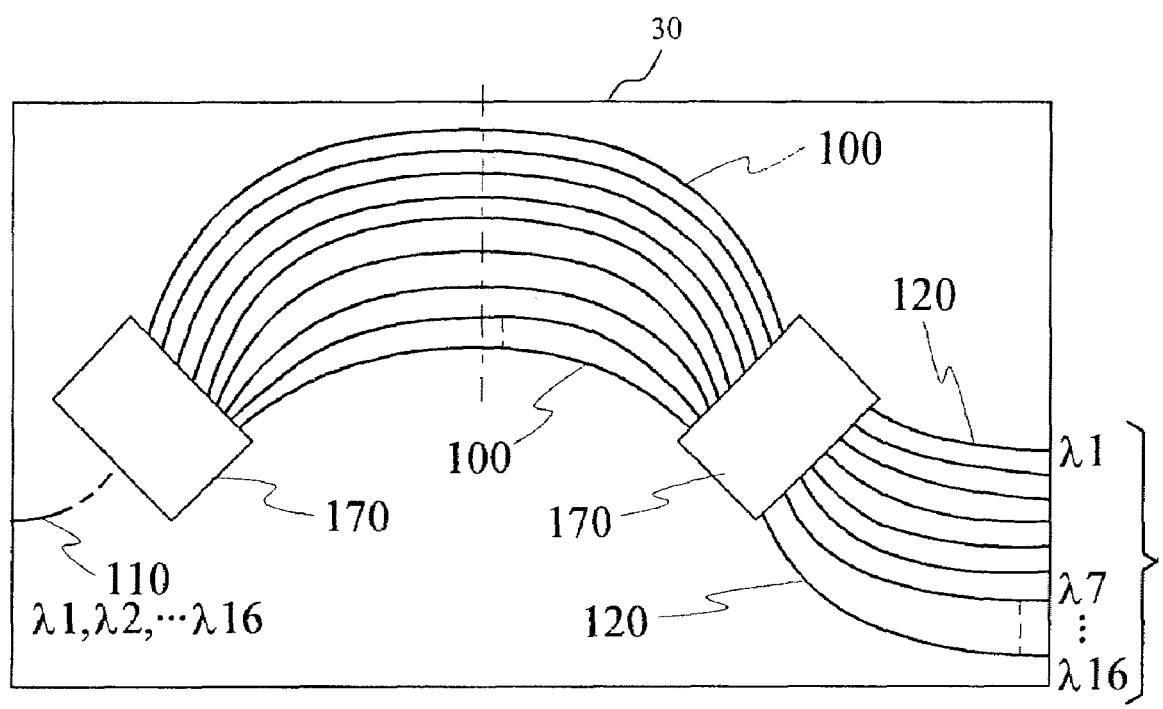
FIG. 3 is a prior art schematic diagram of a prior art AWG.

The demultiplexer 20 is shown as a functional block in FIG. 2 and is captured in more detail by FIG. 3 as an arrayed waveguide grating 30. Basic arrayed waveguides are essentially star couplers coupled therebetween by waveguides 100 of slightly differing lengths. Free-space planar regions 170 are shown at each end of the waveguides 100. In input waveguide 110 where channels λ1 through λ6 are launched in. These appear as separated channels on waveguides 120. As is common in AWGs a single input waveguide is often provided to launch a signal therein and a plurality of output waveguides are generally coupled to locations within a free space region of an AWG where the light is captured and directed outward from the chip. Such an arrangement is shown in U.S. Pat. No. 5,905,824 in the names of Delisle and Teitelbaum assigned to JDS Uniphase Corporation, where a single input waveguide receives a 16-channel signal and spatially separates the 16 channels according to their centre wavelengths along an edge of the chip. It is this AWG that can serve as the basic building block for the instant invention.

Figure 4:
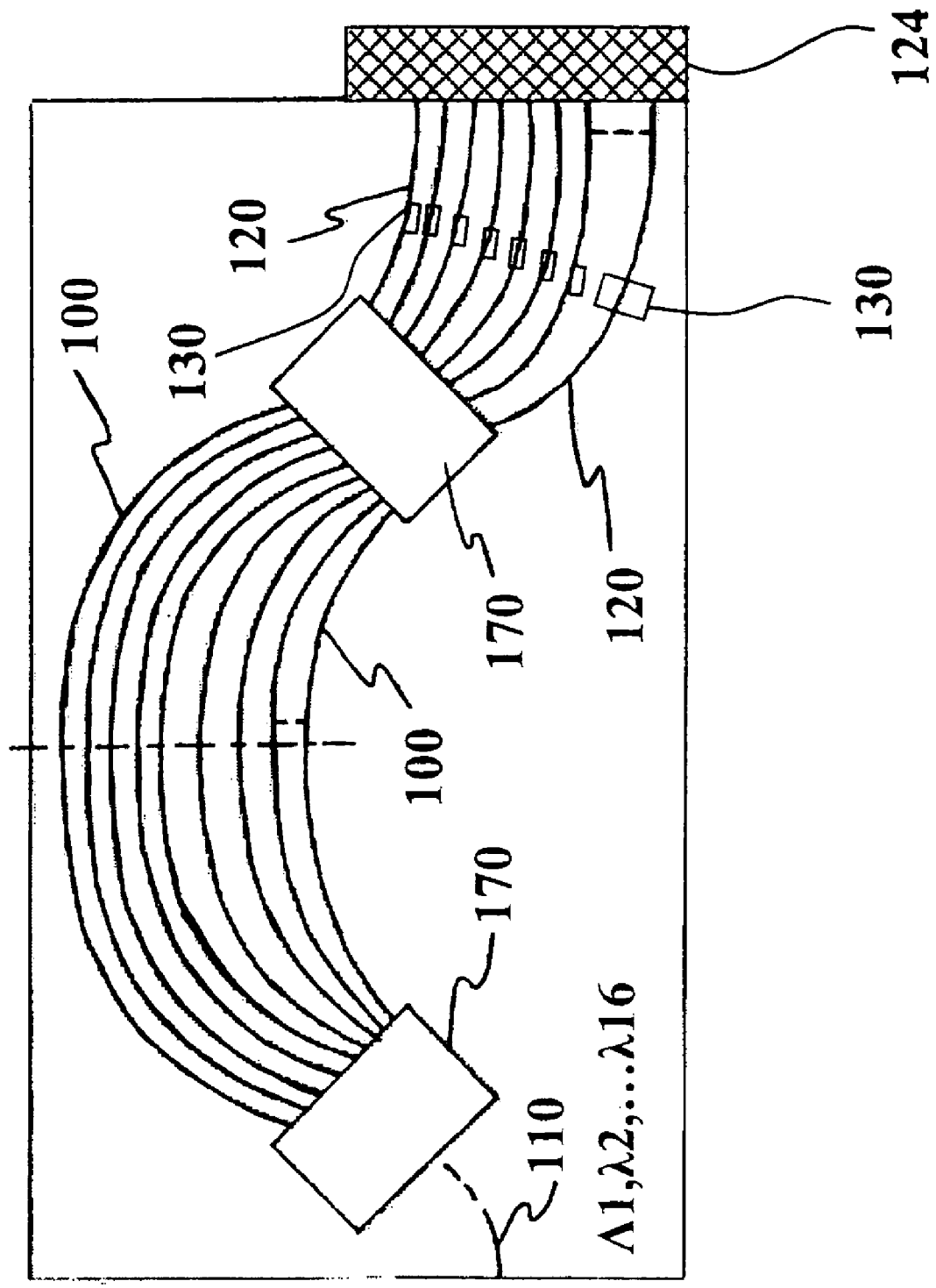
FIG. 4 shows the AWG in FIG. 3 including shutters and a reflector in accordance with this invention.

FIG. 4 illustrates the same AWG placed within a chip and wherein n blockers 130 are strategically disposed along the waveguides 120 providing controllable make/break optical paths to allow light to propagate or to block it. A mirror 124 is conveniently located at an end of the waveguide chip to reflect light that has been allowed to pass along the entire waveguide span. For the purpose of understanding the invention, the waveguides 120 have been described as waveguides having blockers along their lengths; notwithstanding these waveguides could be each formed of two waveguides with a blocking shutter in between or can be one continuous guide with any known means for selectively preventing light from passing along their entire length to reach the mirror 124. This is merely a design choice. The mirror 124 can be coupled and carried by the end face of the waveguide chip by an adhesive or can be coated on the end face of the chip.

Figure 5:
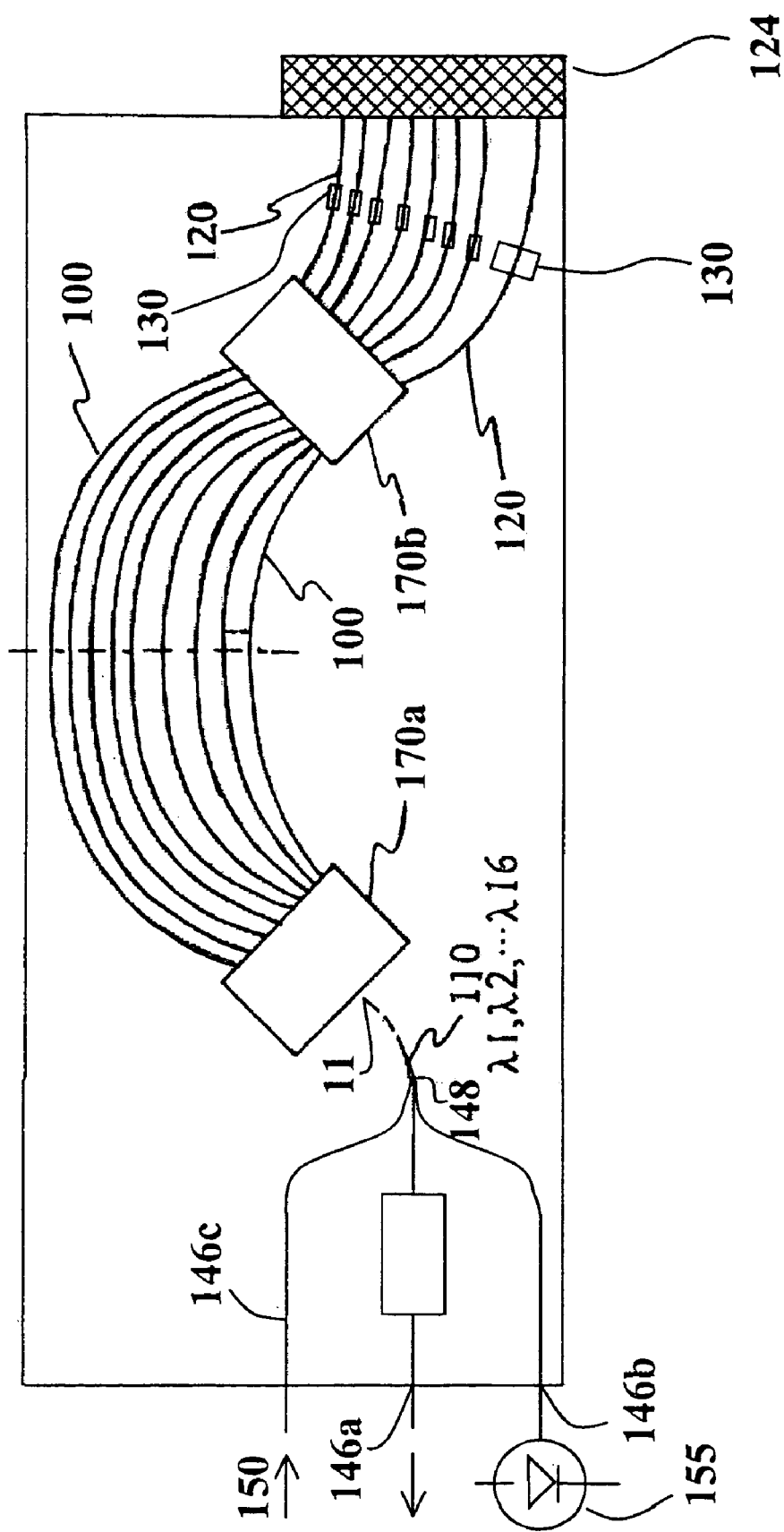
FIG. 5 is a schematic diagram of the device of FIG. 2, where the AWG is shown in more detail.

FIG. 5 illustrates how the chip shown in FIG. 4 becomes a more practicable device when routing means for routing signals into and out of the chip are added into the chip waveguide circuitry resulting in a compact inexpensive chip that can serve as an optical performance monitor. A directional coupler 148 is optically coupled to the input/output port 11 of the AWG via a waveguide 110. The directional coupler 148 routes one or more signals that have been processed by the AWG outward to output ports 146a and 146b. A photodetector 155 is coupled to output port 146b for detecting the intensity of any signals within a detectable range of signals impingent upon it. In another embodiment, the photodetector can be integrated into this chip.

In operation, the circuit in accordance with the embodiment of the invention shown in FIG. 4 functions in the following manner. A composite input signal for example, a typical telecommunications signal comprising n wavelengths is tapped and the tapped portion is fed to input port 150. The signal traverses the input waveguide 146c and passes through the coupler 148 to an input/output port 11 of the planar region 170a of the AWG. The output coupling region 170b of the AWG has n waveguides 120 coupling n demultiplexed sub-beams each having a different centre wavelength out of the of the AWG. In the instance where one channel is to be monitored, one of the n shutters 130 is programmed to pass the one channel and the remaining n–1 shutters are programmed to block the n–1 wavelengths from reaching the reflector 124. Since only the one channel impinges upon the mirror and the n–1 shutters are still in blocking mode, the one channel is routed back through the AWG to the input/output port 11 and to the two output waveguides 146a and 146b. The detector detects the presence of the single channel and the power of the radiation within that channel propagating through the monitor as the light from it impinges upon the detector. Each of the n-channels are monitored serially, and the shutters are programmed to cycle through all n channels. For example, first the nth channels is passed while the remaining n–1 are blocked, then the $n-1^{st}$ channel is passed while the other n–1 channels are blocked, then the $n-2^{nd}$ channel is passed, etc. until all of the channels having different center wavelengths are cycled through, one at a time. The same photodetector detector 155 conveniently used to detect all wavelengths, separately.

The optical channel monitor detects optical power at fixed wavelength windows corresponding to each demultiplexed channel. For telecommunications the windows are centered on the ITU grid.

Figure 6:
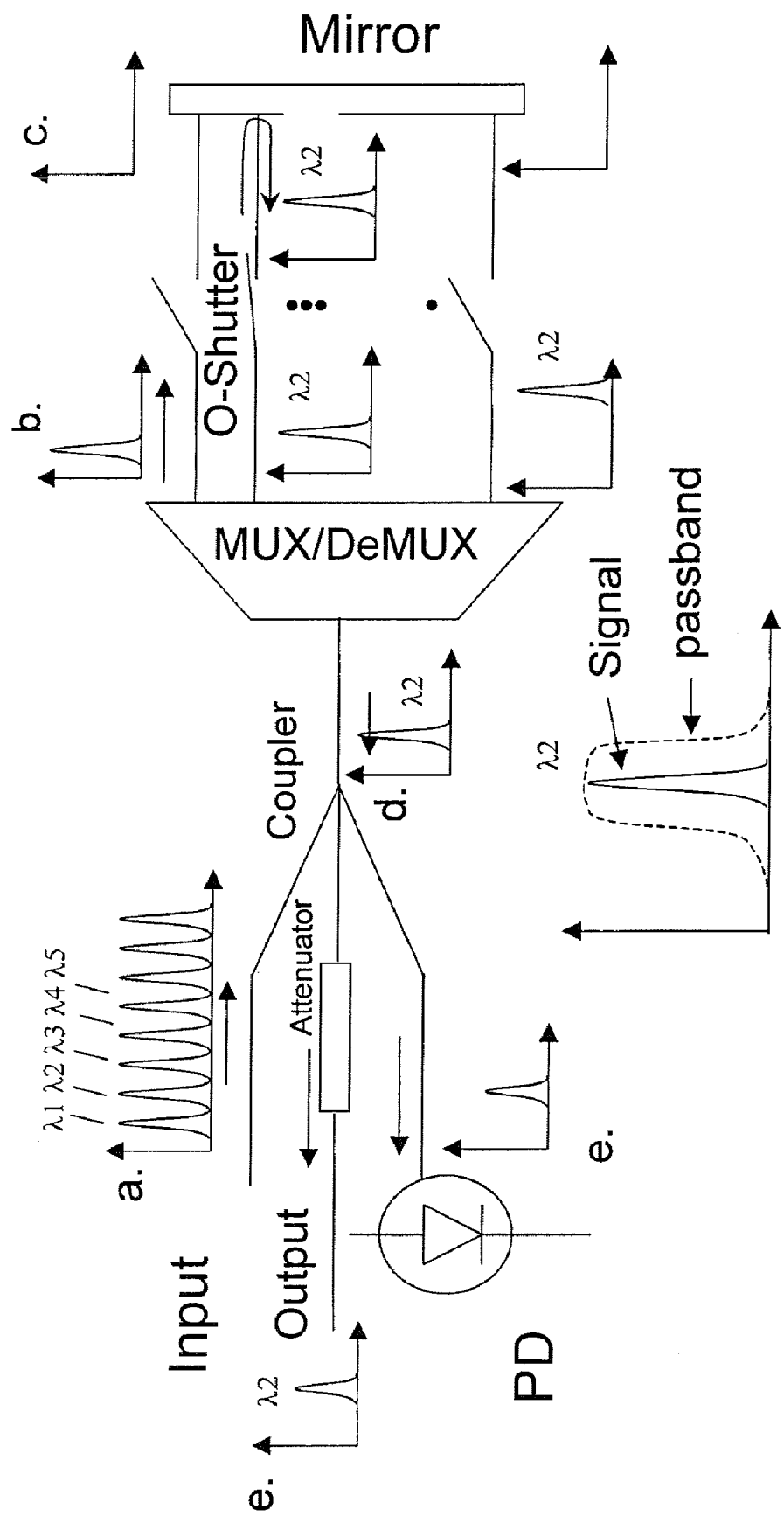
FIG. 6 is a detailed schematic illustrating the operation of the device shown in FIGS. 2 and 5.
Figure 7:
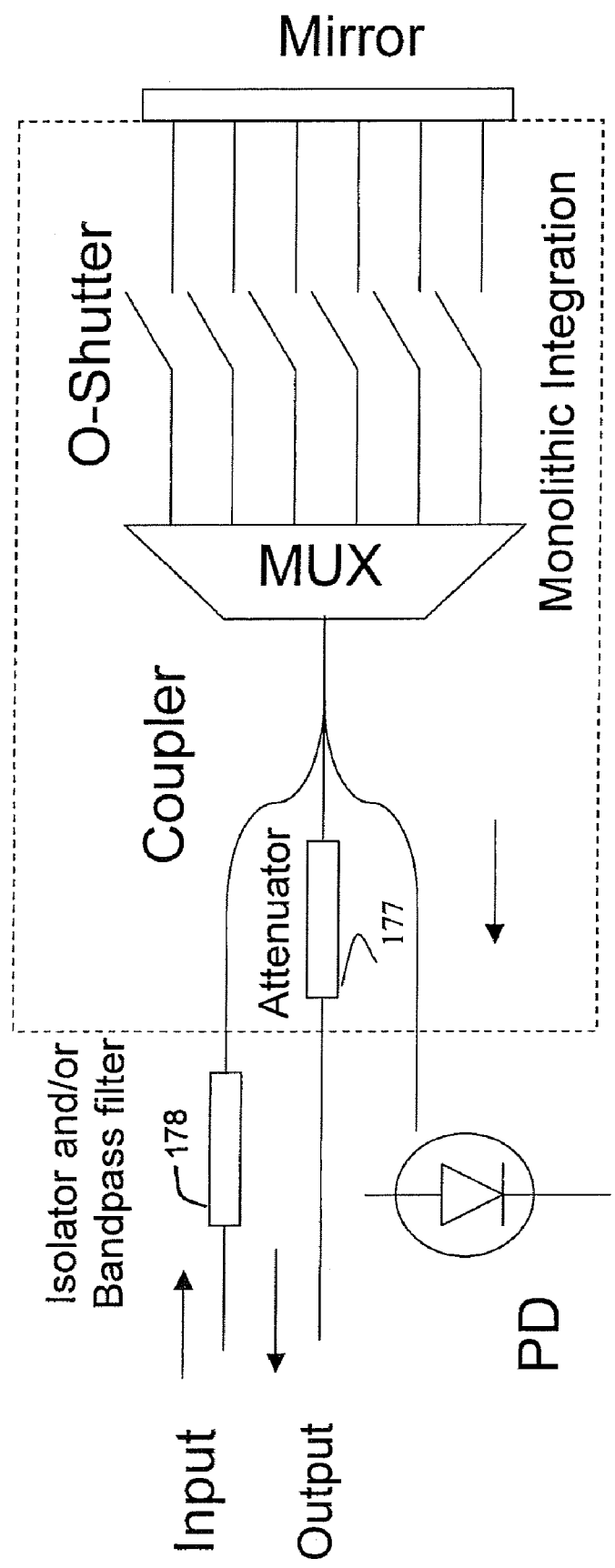
FIG. 7 is a schematic drawing similar to that of FIG. 2 further including a bandpass filter and isolator at the input of the device; and, FIG. 8 is a schematic drawing of an embodiment of the invention wherein two couplers are integrated into the waveguide chip.
Figure 8:
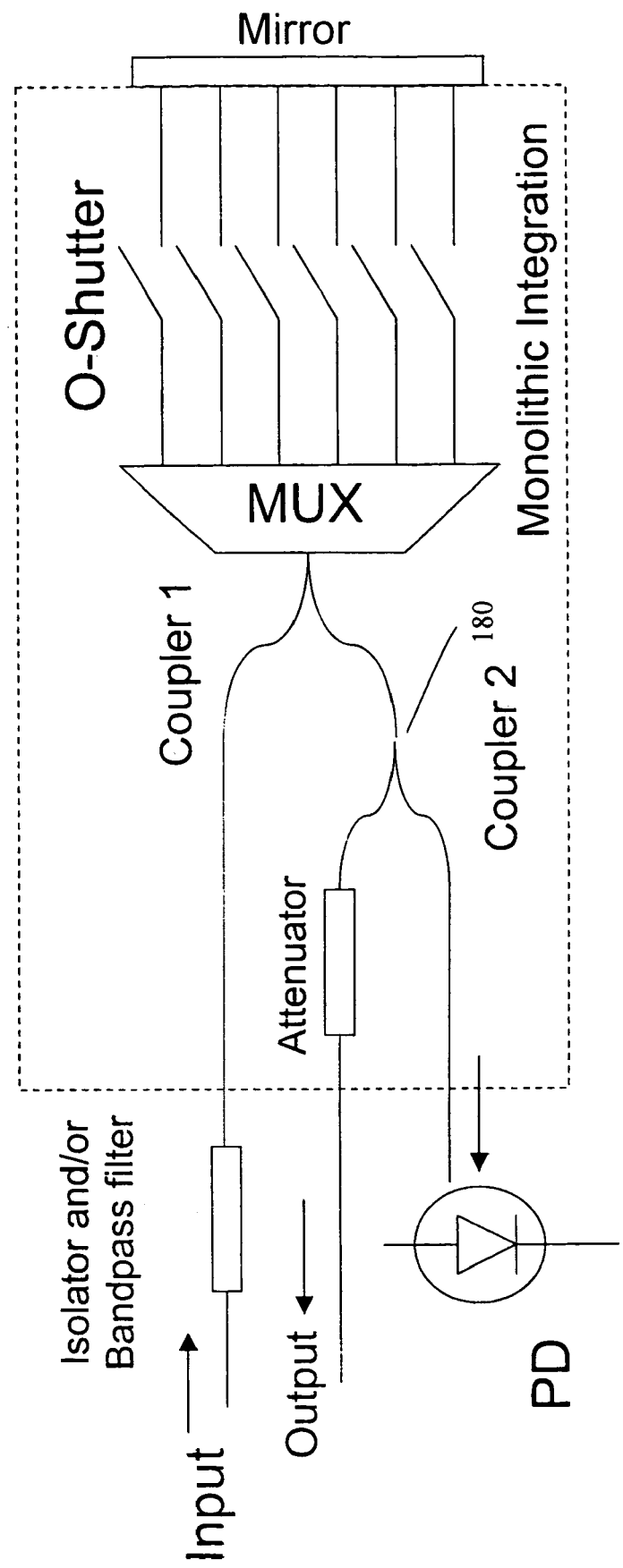

Turning now to FIG. 6 a more detailed diagram illustrating the operation of the device of this invention is shown. Steps (a) through (e) depict how the channels are split and selectively fed back to the output port and to the photodiode (PD). The passband spectral width is critical to the accuracy of maintaining the signal shape and the power accuracy. The channel isolation is dependent upon the channel crosstalk of the AWG and by the double passing through the optical shutters. The output channel attenuation is adjusted by passing the signal through an adjustable attenuator 177 at the output. Referring to FIG. 7 an isolator and/or band pass filter 178 is shown adjacent to the chip at an input end of the device. The isolator is added to increase the return loss and the bandpass filter is added to remove the free spectral range (FSR), that is, the periodic reproduction at different orders of the AWG. The embodiment shown in FIG. 8 is similar to that of FIG. 7, however includes additional waveguide splitter coupler 180, labeled coupler 2.

In summary, the invention provides a chip that can be used as a basic platform for a relatively inexpensive simple to manufacture optical performance monitor. Furthermore, the invention also provides a chip that can be used as an optical power monitor. By having a selected return channels as an optical output, various types of processing can occur; not only can power be monitored, but detailed analysis of the selected signal can be performed, for example with an eye diagram analysis machine. This invention provides a simple elegant chip based solution for selecting and isolating a single channel out of a multiplexed incoming signal for further analysis or processing.

Of course, numerous other embodiments may be envisaged, without departing from the spirit and scope of the invention

What is claimed is:

1. An optical device for monitoring a selected wavelength light signal in a wavelength multiplexed optical signal, comprising:

an array waveguide multiplexer/demultiplexer (AWMD) within a chip, the AWMD having an input/output port and a plurality internal locations to where individual selectable wavelengths are routed as separate wavelength light signals each having a different centre wavelength;

means for coupling the wavelength multiplexed optical signal into the input/output port of the array waveguide multiplexer/demultiplexer for demultiplexing the wavelength multiplexed optical signal into a plurality of wavelength light signals, a plurality of optical shutters associated with each internal location of the array waveguide multiplexer/demultiplexer for selectively blocking or passing the individual wavelength light signals routed to the internal locations of the array waveguide multiplexer/demultiplexer, wherein in operation, each shutter selectively interrupts or allows light to pass along a single optical waveguide so that light that is passed by an optical shutter is reflected back along the same single optical waveguide so as to make a double pass through said shutter, and so that when light is blocked by an optical shutter, and any light leakage is further blocked by the shutter on its return path after being reflected back to the shutter, one or more reflectors optically coupled to the optical shutters for reflecting any light signals received from one or more of the optical shutters back through the one or more optical shutters into the array waveguide multiplexer/demultiplexer for combining any passed light signals into a selected wavelength light signal at the input/output port of the array waveguide multiplexer/demultiplexer;

an optical splitter with an input port and first output port and a second output port for coupling the selected wavelength light signal from the input/output port of the array waveguide multiplexer/demultiplexer to the input port of the optical splitter; and a detector directly coupled with the chip so as to form an integral block or integrated within the chip for monitoring the selected wavelength signal.

2. An optical device as defined in claim 1, wherein the optical shutters are optical switches disposed along single waveguides such that each switch has a single input waveguide and a single output waveguide, wherein when the switch selectively blocks the transmission of light, it substantially prevents light from propagating from the single input waveguide to the single output waveguide in a first direction.

3. An optical device as defined in claim 1, wherein the plurality of optical shutters are capable of blocking light so as to substantially prevent essentially all of said light form reaching the one or more reflectors.

4. An optical device for monitoring a selected wavelength light signal in a wavelength multiplexed optical signal, comprising:

an array waveguide multiplexer/demultiplexer (AWMD) within a chip, the AWMD having an input/output port and a plurality internal locations to where individual selectable wavelengths are routed as separate wavelength light signals each having a different centre wavelength;

means for coupling the wavelength multiplexed optical signal into the input/output port of the array waveguide multiplexer/demultiplexer for demultiplexing the wavelength multiplexed optical signal into a plurality of wavelength light signals, a plurality of optical shutters associated with each internal location of the array waveguide multiplexer/multiplexer for selectively blocking or passing the individual wavelength light signals routed to the internal locations of the array waveguide multiplexer/demultiplexer;

one or more reflectors optically coupled to the optical shutters for reflecting any light signals received from one or more of the optical shutters back through the one or more optical shutters into the array waveguide multiplexer/demultiplexer for combining any passed light signals into a selected wavelength light signal at the input/output port of the array waveguide multiplexer/demultiplexer;

an optical splitter with an input port and first output port and a second output port for coupling the selected wavelength light signal from the input/output port of the array waveguide multiplexer/demultiplexer to the input port of the optical splitter;

an optical attenuator optically coupled to the first output port of the optical splitter and optically coupled to a user connection port for providing to the user an attenuated selected wavelength light signal; and a photodiode optically coupled to the first output port of the optical splitter for monitoring the selected wavelength light signal, in the array waveguide optical multiplexer/demultiplexer, wherein the optical splitter and the optical attenuator are monolithically integrated in the same planar waveguide chip.

5. A device for monitoring a selected wavelength light signal in a wavelength multiplexed optical signal as defined in claim 4, wherein the one or more reflectors are mounted to and supported by an end of the array waveguide multiplexer/demultiplexer chip or forms part of the chip.

* * * * *